United States Patent
Sasajima et al.

(10) Patent No.: US 6,641,299 B2
(45) Date of Patent: *Nov. 4, 2003

(54) FIXED-POINT CELL, THERMOMETER CALIBRATION METHOD AND FIXED-POINT TEMPERATURE REALIZING APPARATUS

(75) Inventors: Naohiko Sasajima, Ibaraki (JP); Yoshiro Yamada, Ibaraki (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/086,684

(22) Filed: Mar. 4, 2002

(65) Prior Publication Data

US 2002/0122457 A1 Sep. 5, 2002

(30) Foreign Application Priority Data

Mar. 2, 2001 (JP) ........................ 2001-058447

(51) Int. Cl.$^7$ ............................ G01K 15/00; G01J 5/52
(52) U.S. Cl. ........................................ 374/2; 250/495.1
(58) Field of Search ............................ 374/2, 3, 1, 139, 374/157, 25, 26, 16, 121; 250/252.1 A, 493.1, 495.1

(56) References Cited

U.S. PATENT DOCUMENTS

| | | | | |
|---|---|---|---|---|
| 3,077,539 A | * | 2/1963 | Blau, Jr. et al. | 374/2 |
| 3,270,547 A | * | 9/1966 | MacRitchie et al. | 374/3 |
| 3,513,705 A | | 5/1970 | Severin | 374/106 |
| 4,244,207 A | * | 1/1981 | Staunton | 374/3 |
| 4,627,740 A | * | 12/1986 | Jerde et al. | 374/1 |
| 5,608,838 A | * | 3/1997 | Brookley | 374/2 |
| 6,398,405 B1 | * | 6/2002 | Yamada | 374/2 |

FOREIGN PATENT DOCUMENTS

| | | |
|---|---|---|
| EP | 1 008 839 | 6/2000 |
| JP | 2000-180272 | 6/2000 |

OTHER PUBLICATIONS

Quinn, T.J., "News from the BIPM", Metrologia 34, pp. 187, 192 (1997).*
Bedford, R. E., et al, "Recommended values of temperature on the International Temperature Scale of 1990 for a selected set of secondary reference points"; Metrologia 33, pp. 133–154 (1996).*
Preston–Thomas, H., "The International Temperature Scale of 1990 (ITS–90)", Metrologia 27, pp. 3–10 (1990).*
Miyagawa, K., "Apparatus of Tin Point," Trans. Soc. Instrum. and Control Eng. (Japan), vol. 18, No. 1, pp. 46–50 (Feb 1976).*
Chapter 7, pps. 252–291, "How to Use Thermometer Correctly" (with English Abstract and discuss in the Specification) (no date).

(List continued on next page.)

Primary Examiner—Diego Gutierrez
Assistant Examiner—Stanley J. Pruchnic, Jr.
(74) Attorney, Agent, or Firm—Oblon, Spivak, McClelland, Maier & Neustadt, P.C.

(57) ABSTRACT

A thermometer calibration method and fixed-point temperature realizing apparatus uses a fixed-point cell including a crucible of carbon and a fixed-point material enclosed in the crucible. The fixed-point material is a eutectic structure of carbide and carbon. The fixed-point cell is placed in a furnace for increasing and decreasing the environmental temperature of the cell. A thermometer to be calibrated is used to measure temperature variations in the cell and calibrated based on the temperature variations thus measured.

20 Claims, 5 Drawing Sheets

OTHER PUBLICATIONS

T. J. Quinn, et al., Instrument Society of America, vol. 4, Part 1, pps. 295–309, "The Freezing Point of Platinum Determined by the NPL Photoelectric Pyrometer", 1972 (no month).

P. B. Coates, et al., High Temperatures–High Pressures, vol. 15, pps. 573–582, "A New Determination of the Freezing Point of Palladium", 1983 (no month).

H. Sakate, et al., Metrologia, vol. 32, pps. 129–131, "Observation of $Al_2O_3$ Melting and Freezing Plateaus Using a Cavity–type Tungsten Crucible", 1995 (no month).

H. Itoh, The Society of Instrumentation and Control Engineers, vol. 19, No. 12, pps. 978–982, "The Ag–Cu Eutectic Point as a Reference Temperature", 1983 (no moth).

* cited by examiner

3000°C
— Os-C (2732°C)
2500°C
— Re-C (2474°C)
— Ir-C (2290°C)
2000°C
— Ru-C (1953°C)
— Pt-C (1738°C)
— Rh-C (1657°C)
— Pd-C (1429°C)
1500°C
— Ni-C (1329°C)
— Co-C (1324°C)
— Fe-C (1153°C)
1000°C

| Eutectic structure | Temp. |
|---|---|
| BsC+C | 2375 |
| δ (Mo Carbide)+C | 2589 |
| VC+C | 2670 |
| γ (W Carbide)+C | 2760 |
| TiC+C | 2776 |
| ZrC+C | 2927 |
| HfC+C | 3180 |
| $NbC_{1x}$+C | 3300 |
| TaC+C | 3445 |

| Eutectic structure | Temp. |
|---|---|
| $ScC_{1-x}$+C | 1722 |
| γ (Y Carbide)+C | 2290 |
| $LaC_2$+C | 2250 |
| $CeC_2$+C | 2220 |
| $PrC_2$+C | 2254 |
| $NdC_2$+C | 2260 |
| $SmC_2$+C | 2240 |
| $GdC_2$+C | 2280 |
| $TbC_2$+C | 2275 |
| $DyC_2$+C | 2260 |
| $HoC_2$+C | 2270 |
| $ErC_2$+C | 2260 |
| $TmC_2$+C | 2245 |
| $YbC_2$+C | 2215 |
| $LuC_2$+C | 2230 |

FIXED-POINT CELL, THERMOMETER CALIBRATION METHOD AND FIXED-POINT TEMPERATURE REALIZING APPARATUS

BACKGROUND OF THE INVENTION

1. Field of the Invention

The present invention relates to a fixed-point cell required to calibrate a thermometer such as, for example, a radiation thermometer used in a high-temperature region exceeding 1100° C., and to a thermometer calibration method and fixed-point temperature realizing apparatus using the cell.

2. Description of the Prior Art

When thermometers are calibrated, at or above a room temperature region, a freezing point or a melting point of a metal is employed as a defining fixed-point temperature of the International Temperature Scale of 1990 (ITS-90). A fixed-point cell is used as a method of realizing the fixed-point temperature. Carbon crucibles, in which pure metal is cast as a fixed-point material of high melting point, have been usually used as the fixed-point cell. A thermometer is calibrated utilizing the fact that when the liquid phase and the solid phase of the fixed-point material coexist in the crucible, the temperature of the cell is not varied due to the latent heat of the melting. This is realized by placing the fixed-point cell in a temperature-variable furnace and observing the temperature variation of the cell when an environmental temperature is increased and decreased (see Chapter 7 of "New Edition of Proper Use of Thermometer," edited by Japan Electric Instrument Manufacturers' Association, published by Nihon Kogyo Publishing Co. (1997)).

The maximum fixed-point temperature is the copper point of 1085° C.; at temperatures higher than the copper point the temperature scale is defined by extrapolation. In the temperature region above the copper point the temperature scale is maintained by utilizing a radiation thermometer calibrated at a fixed point below the copper point, or by transferring the radiance temperature to the current of a tungsten ribbon lamp.

Attempts to realize a fixed-point temperature in the temperature region above the copper point include attempts to realize the freezing point of palladium (freezing point: 1550° C.) and platinum (freezing point: 1770° C.), and an example where the fixed-point temperature was measured by melting them using an alumina crucible has been reported (see T. J. Quinn, T. R. D. Chandler: Temperature, Its Measurement and Control in Science and Industry, H. H. Plumb, (ed.), Vol. 4, Part 1, p. 295, Pittsburgh: Instrument Society of America (1972), P. B. Coates, T. R. D. Chandler, J. W. Andrews: High Temperature and High Pressure, Vol. 15, p. 573 (1983)).

There has also been reported an attempt at obtaining a fixed-point temperature by using tungsten as a crucible material, melting alumina therein, observing the melting and freezing thereof at 2050° C. with a radiation thermometer and using that as a fixed-point temperature (see H. Sakate, F. Sakuma, A. Ono: Metrologia, Vol. 32, p. 129 (1995)).

On the other hand, an attempt has been made to use metal-metal eutectics as a fixed-point temperature material. It has been reported that a fixed-point temperature was realized by casting copper-silver eutectics or copper-aluminum eutectics in a carbon crucible and observing the melting and freezing thereof (Itoh, Papers Of The Society of Instrumentation and Control Engineers, Vol 19, No. 12, p. 978 (1983)).

One of the present inventors has proposed a fixed-point cell comprising a crucible composed of carbon, a fixed-point material enclosed in the crucible that is a eutectic structure of carbon and metal, a fixed-point temperature realizing apparatus using the fixed-point cell comprising a furnace having the fixed-point cell disposed therein for increasing and decreasing an environmental temperature of the cell and a thermometer to measure temperature variations in the cell, and a calibration method for calibrating the thermometer based on the measured temperature variations (JP-A 2000-180272).

The maximum temperature of conventional fixed-point cells which use carbon and in which pure metal is cast is the copper point of 1085° C. (FIG. 2). This is because when a metal having a higher melting point is melted in a carbon crucible, the carbon is dissolved in the metal, reducing the purity of the metal and thereby lowering the freezing point.

Thus, there is no fixed-point cell above the copper point, so the temperature scale is maintained by a ribbon lamp or radiation thermometer. However, the dependency on extrapolation of the temperature scale thus maintained greatly reduces the accuracy of the temperature scale. For example, in the case of calibration traceability of radiation thermometers in Japan, the provided accuracy is 0.3° C. at 1085° C., decreasing sharply to 4° C. at 1600° C. and to 8° C. at 2000° C.

Moreover, setting a higher-accuracy scale, using a high-accuracy radiation thermometer, for example, together with the precise evaluation of the thermometer characteristics and the like, involves a massive effort. However, since it still depends on extrapolation, the resulting uncertainty in temperature scale realization and maintenance is still in the region of 0.8° C. at 2000° C.

Also, since the emissivity of the ribbon in a ribbon lamp is not 1, correction is required depending on the measurement wavelength. In addition to the difficulty of using a ribbon lamp with high accuracy, the ribbon has to be sealed in an inert gas atmosphere since the tungsten vaporizes at temperatures above 2000° C. As a result, stable ribbon lamp characteristics cannot be obtained due to the convection of the inert gas.

For realizing the palladium point or the platinum point, an alumina crucible can be used in the measurement for a short period. However, it is not practical for repeated use because the alumina is brittle and susceptible to thermal shock, making the crucible thus used prone to breakage, while a further problem is that owing to metal contamination arising from the alumina reduction, the crucible has to be used in an oxidizing atmosphere.

The method of melting alumina in a tungsten crucible has low realizability. The reasons for this include the poor workability of tungsten, the difficulty of sealing molten alumina into a lateral crucible, and the fact that sufficient accuracy cannot be obtained since a blackbody cavity whose emissivity is near to 1 cannot be formed due to the low emissivity of the tungsten.

The method of using metal-metal eutectics serves the purpose of increasing the number of fixed-point temperatures in a temperature region lower than the copper point. When the same method is used in a temperature region higher than the copper point, a fixed-point temperature cannot be realized because a freezing point is unavoidably lowered by the dissolution of carbon.

In the case of the method using a fixed-point cell comprising a crucible composed of carbon and a fixed-point material in the crucible that is a eutectic structure of carbon and metal, it is only possible to realize a fixed-point temperature up to 2732° C. (FIG. 3). As a practical problem, osmium oxide is a colorless, highly-toxic gas. Considering its unsuitability as a fixed-point substance, as a fixed-point temperature using a eutectic structure of carbon and metal, the maximum temperature is 2474° C. using a eutectic structure of carbon and rhenium.

An object of the present invention is to overcome the above shortcomings of the prior art by providing a fixed-point cell that extends the fixed-point temperature region to the temperature region exceeding 2500° C. and enables the achievement of high calibrating accuracy in the calibration of all thermometers that are used in a high temperature region such as radiation thermometers and the like, and a thermometer calibration method and fixed-point temperature realizing apparatus using the above cell

SUMMARY OF THE INVENTION

To attain the above object, the present invention provides a fixed-point cell comprising a crucible composed of carbon and a fixed-point material enclosed in the crucible, wherein the fixed-point material is a eutectic structure of carbide and carbon.

A fixed-point temperature realizing apparatus according to the present invention comprises a fixed-point cell comprising a crucible composed of carbon and a fixed-point material enclosed in the crucible that is a eutectic structure of carbide and carbon, and a furnace having the fixed-point cell disposed therein for increasing and decreasing an environmental temperature of the cell and a thermometer to measure temperature variation in the cell.

A calibration method for calibrating a thermometer according to the present invention, the method comprising enclosing a fixed-point material that is a eutectic structure of carbide and carbon in a crucible composed of carbon to form a fixed-point cell, raising and lowering an environmental temperature of the cell, measuring the temperature variation of the cell with a thermometer to be calibrated, and calibrating the thermometer based on the measured temperature variation.

As the carbide, there may be used a carbide of any of boron, molybdenum, vanadium, titanium, zirconium, hafnium, niobium, tantalum, tungsten, and rare earth elements.

The thermometer may be a thermometer used for measuring high temperatures such as a radiation thermometer.

As described in the foregoing, accurate thermometer calibration can be effected even in a temperature region exceeding 2500° C. by using a fixed-point material having a eutectic structure of carbide and carbon.

Further features of the invention, its nature and various advantages will be more apparent from the accompanying drawings and following detailed description of the invention.

DESCRIPTION OF THE PREFERRED EMBODIMENT

Embodiments of a fixed-point cell, and a fixed-point temperature realizing apparatus and thermometer calibration method using the cell, will now be described below, with reference to the accompanying drawings.

Figure 1:
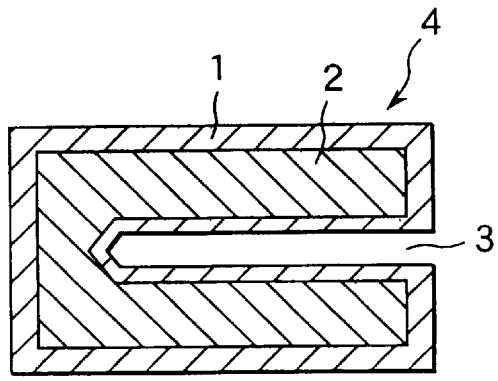
FIG. 1 is a sectional view showing an embodiment of a fixed-point cell according to the present invention.

FIG. 1 is a sectional view showing an embodiment of a fixed-point cell 4 according to the present invention, comprising a crucible 1 and a carbide-carbon eutectic structure 2 enclosed in the crucible 1. The temperature of the melting point and the freezing point of the eutectic structure 2 is used as a fixed-point temperature. Reference numeral 3 denotes a blackbody cavity.

The fixed-point cell 4 calibrates a thermometer to be calibrated by disposing the cell in a temperature-variable electric furnace, measuring the temperature variation therein with the thermometer when an environmental temperature is increased and decreased and making use of the fact that when the liquid phase and the solid phase of the fixed-point material coexist in the cell, the temperature variation disappears due to the latent heat of the melting. The thermometer to be calibrated can be any of various types of thermometer used at high temperatures such as a radiation thermometer and a thermocouple and the like. The carbide materials used in the cell are ones that form carbon eutectics whose melting point is higher than the copper point. Specifically, there may be used a carbide of any of boron, molybdenum, vanadium, titanium, zirconium, hafnium, niobium, tantalum, tungsten, and rare earth elements.

Figure 2:
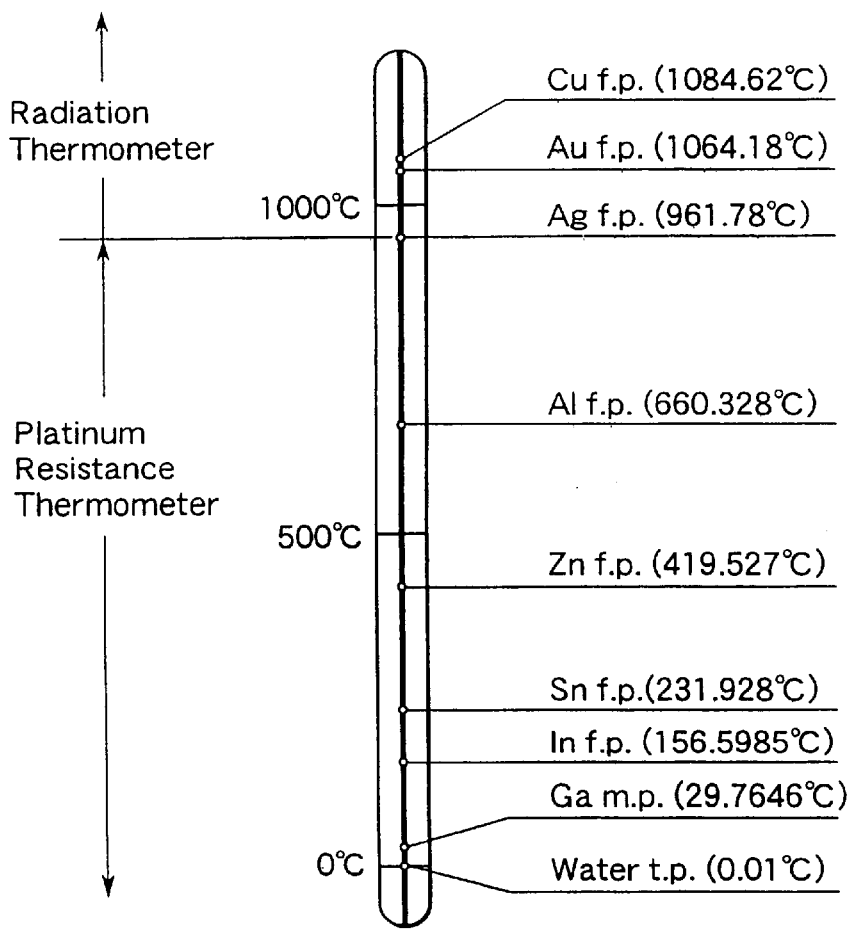
FIG. 2 shows pure-metal fixed-point temperatures in accordance with ITS-90.
Figures 3, 4A, 4B:
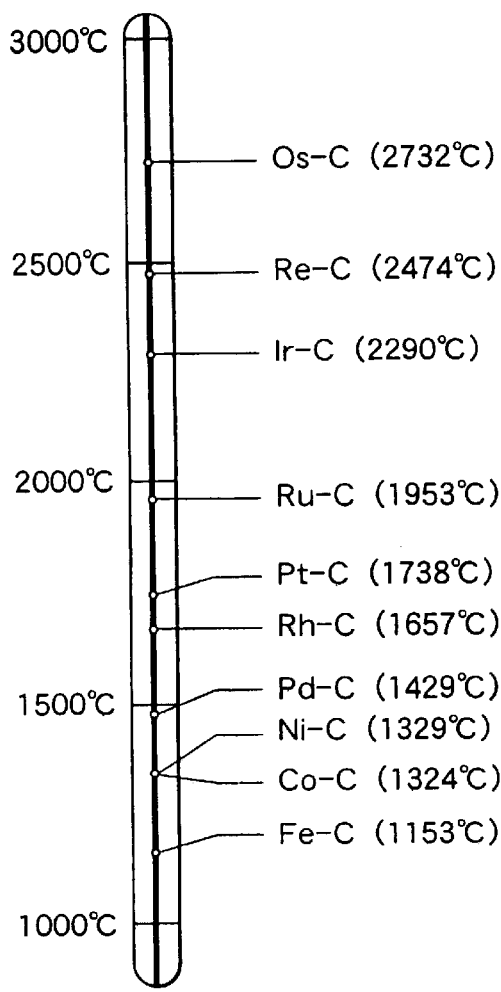
FIG. 3 shows the fixed-point temperatures of metal-carbon eutectic structures described in JP-A 2000-180272.
FIG. 4(a) shows fixed-point temperatures of eutectic structures of metal carbide and carbon used in the present invention.
FIG. 4(b) shows fixed-point temperatures of eutectic structures of rare earth carbide and carbon used in the present invention.

FIG. 2 shows pure-metal fixed-point temperatures in accordance with ITS-90, conventionally used at above ambient temperatures, in which reference symbol f.p. denotes a freezing point, m.p. a melting point and t.p. a triple point, and FIG. 3 shows the fixed-point temperatures of metal-carbon eutectic structures described in JP-A 2000-180272. From FIG. 2, it can be seen that in the case of the cell in which pure metal is cast, the copper point of 1085° C. is the maximum temperature. On the other hand, in the case of a fixed-point cell with a fixed-point material composed of a carbon-metal eutectic, as shown in FIG. 3, the maximum temperature is 2474° C. using a practicable rhenium eutectic structure.

Figure 5:
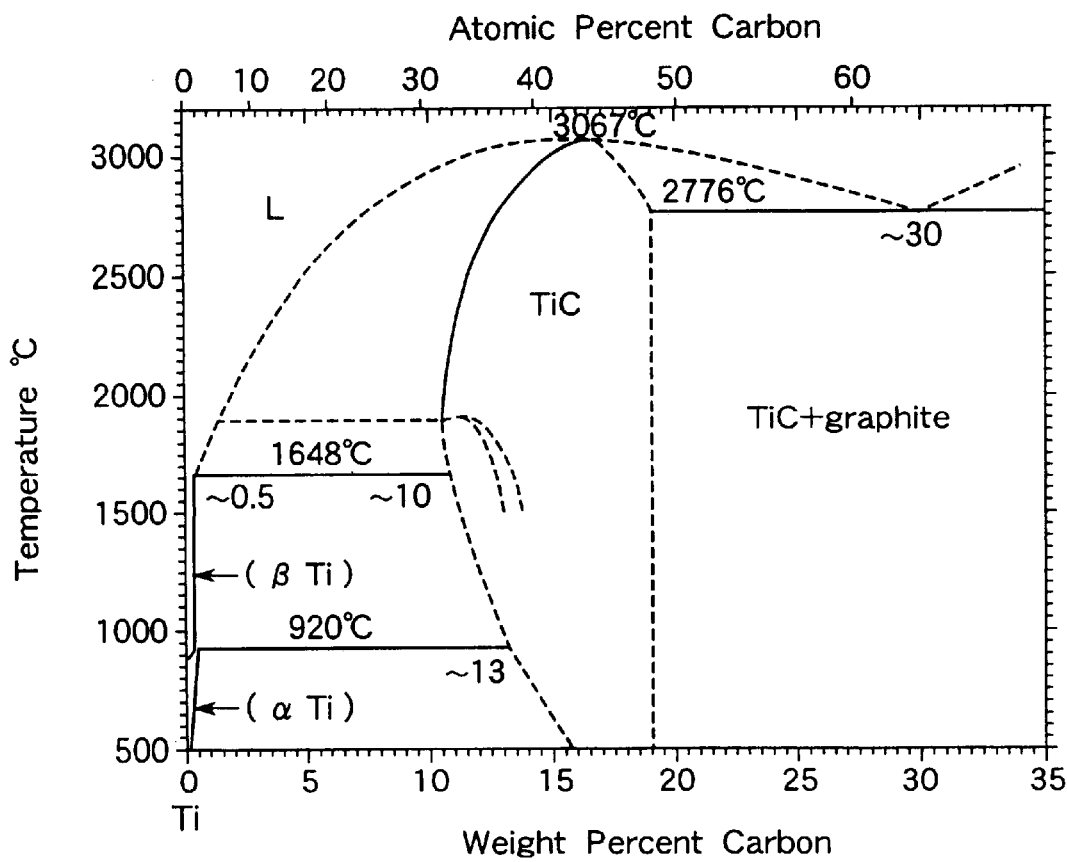
FIG. 5 is an example of a diagram showing the phase of carbide-carbon eutectic material used in the present invention.

FIGS. 4(a) and 4(b) show fixed-point temperatures of carbide-carbon eutectic structures used in the present invention, and FIG. 5 is an example of a diagram showing the phase of titanium-carbon used in the present invention.

The operation of the fixed-point cell of the present invention will now be described with reference to FIGS. 4 and 5. While the freezing point of titanium carbide (TiC) is 3067° C., it can be seen from FIG. 5 that the fixed-point eutectic used in the present invention has a freezing point temperature of 2776° C. in a composition ratio containing 30 wt % of carbon.

If the melting point is exceeded, there is some dissolution of the carbon of the crucible. However, when the temperature is again decreased, the composition ratio of the eutectic is recovered when the freezing point is reached because excess carbon is precipitated. As a result, melting and freezing plateaus having good reproducibility can be observed. Also, since the carbide-carbon eutectic uses the same material as the crucible, the crucible material is intrinsically free of impurities from the crucible, so the freezing point does not drop. Moreover, since carbon is used for the crucible, there is no problem with respect to crucible durability, in contrast to when an alumina crucible is used. Furthermore, when the eutectic to which carbon was added beforehand is melted at the eutectic composition ratio thereof, there is only slight dissolution of the carbon from the crucible, and the crucible durability is not degraded by the melting.

In addition, since carbon having high emissivity is used as the crucible material, a blackbody cavity 3 having sufficiently high emissivity can be readily formed and is also suitable for calibrating a radiation thermometer. A thermometer calibrated at these fixed-point temperatures is calibrated by interpolation up to the high temperature of 3445° C., the calibration accuracy thereof is markedly improved. And, even if the thermometer is calibrated by extrapolation using any of the fixed-point temperatures, extrapolation accuracy can be greatly improved as compared with a conventional method, since the calibration is carried out at a temperature that is higher than the copper point.

Figure 6:
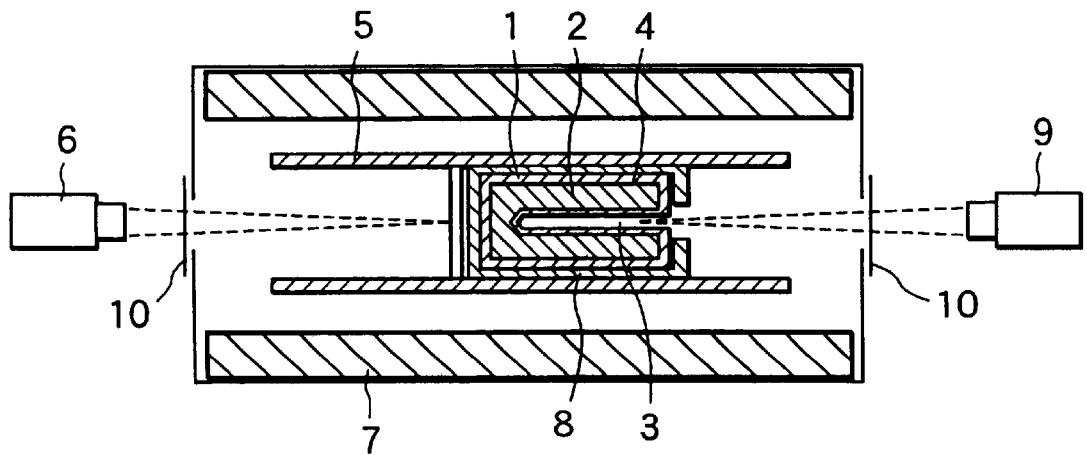
FIG. 6 is a sectional view of an embodiment of the fixed-point temperature realizing apparatus according to the present invention.

FIG. 6 shows a first embodiment of the fixed-point temperature realizing apparatus according to the present invention. As a specific example of the fixed-point cell, a fixed-point cell 4 is used comprising the crucible 1 in which is cast the titanium carbide-carbon eutectic structure 2 composed of titanium to which 30 wt % of carbon is added. The cell is placed in a transverse temperature-variable electric furnace. The temperature-variable furnace includes a carbon furnace core tube 5 that is heated by direct current flow, and a heat insulator 7 that covers the core tube 5. The interior of the furnace is evacuated to a vacuum and the interior is then charged with an inert gas atmosphere. A carbon heat insulator 8 is inserted around the fixed-point cell 4 to increase the uniformity of the temperature distribution and to improve the electrical insulation between the furnace core tube 5 and the fixed-point cell 4. The blackbody cavity 3 is formed at one end of the fixed-point cell. A radiation thermometer 9 to be calibrated, provided outside the furnace, measures the temperature of the fixed-point cell by detecting the light radiated from the blackbody cavity 3 through a quartz glass sight hole 10. The internal temperature of the furnace is monitored from the other end of the furnace by another radiation thermometer 6, providing an output signal that is input to a control unit (not shown) that controls the heating current.

Figure 7:
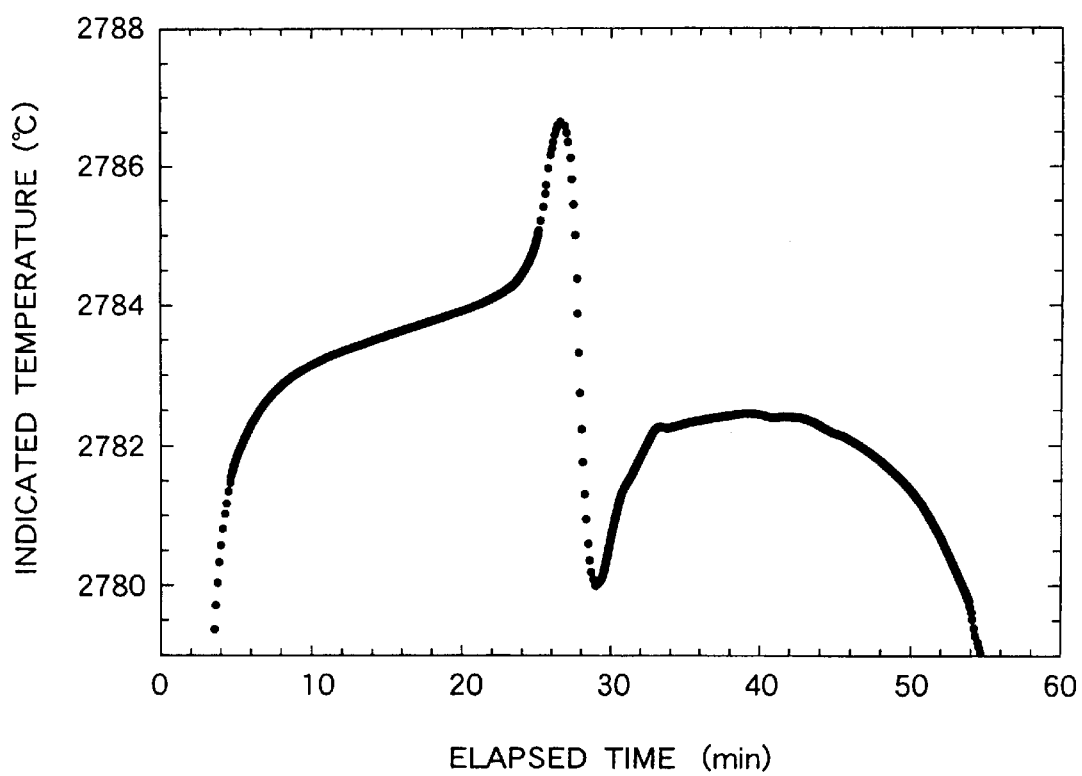
FIG. 7 shows an example of the output of a thermometer to be calibrated according to the embodiment of FIG. 6.

FIG. 7 shows an example of the output of a radiation thermometer to be calibrated used to measure the cell temperature. This shows that melting and freezing plateaus can be observed, showing that calibration at the fixed-point temperature is possible.

Figure 8:
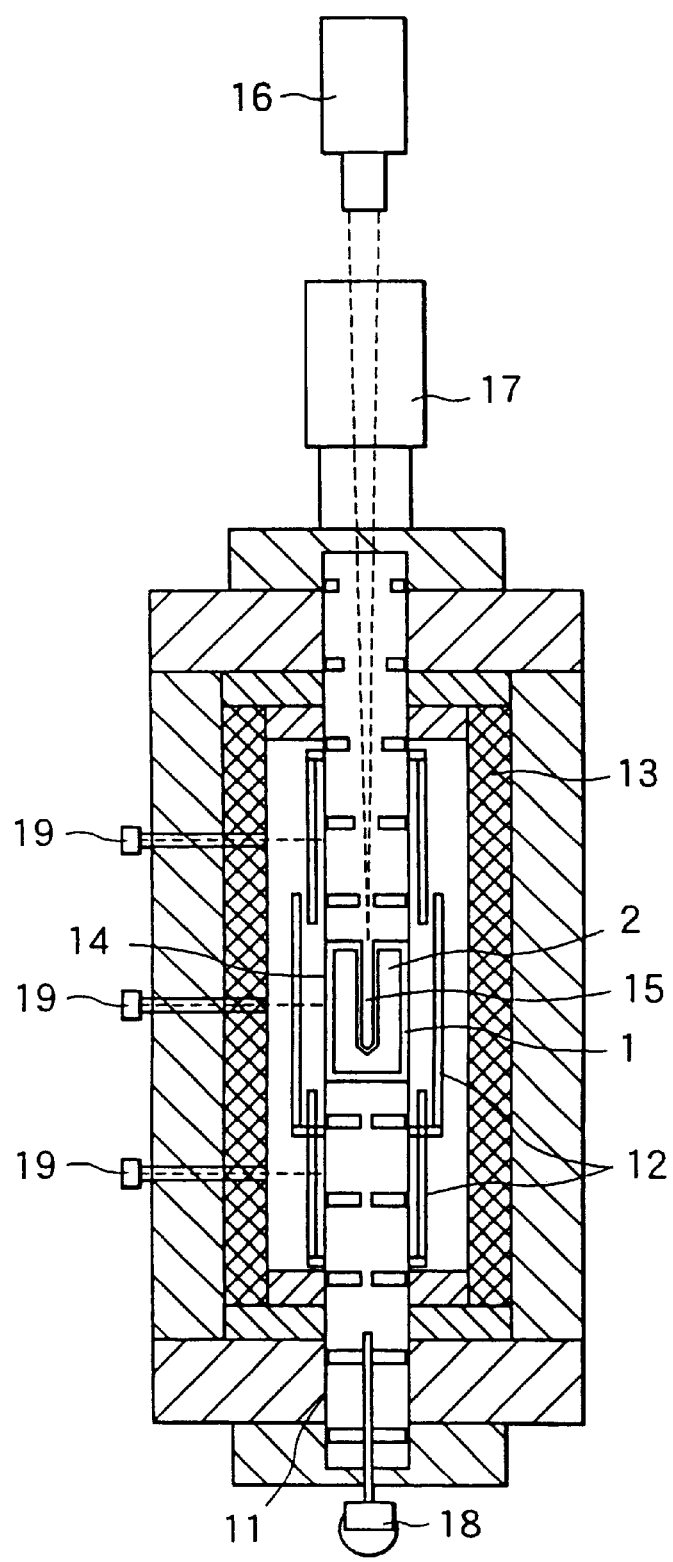
FIG. 8 is a sectional view of another embodiment of the fixed-point temperature realizing apparatus according to the present invention.

FIG. 8 shows a second embodiment of the fixed-point temperature realizing apparatus of the invention. With reference to FIG. 8, a fixed-point cell 14 containing a carbide-carbon eutectic structure is disposed in a vertical temperature-variable electric furnace. The temperature-variable furnace includes a carbon furnace core tube 11, heater elements 12 around the furnace core tube 11, and heat insulators 13 around the heater elements 12. The core tube 11 interior is evacuated and then charged with an inert gas.

A blackbody cavity 15 is formed in the upper part of the fixed-point cell 14. A radiation thermometer 16 to be calibrated, provided outside the furnace, measures the temperature of the fixed-point cell 14 by detecting the light radiated from the blackbody cavity 15 through a purge unit 17 with no sight hole. A thermocouple 18 inserted into the furnace from the lower end thereof is used to monitor the internal temperature of the furnace. To increase the uniformity of the temperature distribution around the fixed-point cell 14, control radiation thermometers 19 are used to control the heater elements 12 by dividing the heating control into an upper zone, a middle zone and a lower zone. With the apparatus thus configured, to calibrate the radiation thermometer 16, the thermometer 16 is used to measure temperature variation of the fixed-point cell 14 when the temperature around the fixed-point cell 14 is increased and decreased. The correlation between the thermometer output and the fixed-point temperature values is used to provide the calibration.

While the present invention has been described with reference to the above embodiments, the invention is not limited to the embodiments but may be embodied in various ways within the scope of the invention as defined in the appended claims. While, for example, the thermometers to be calibrated have been described with reference to radiation thermometers, the invention is not limited thereto, it being possible to calibrate other types of thermometers such as a thermocouple, a fiber-optic thermometer, and so forth.

In contrast to the prior art in which adequate accuracy could not be attained owing to the fact that at temperatures above the copper point of 1085° C., it was necessary to rely on extrapolation, with the present invention high-temperature calibration of radiation thermometers, thermocouples and other thermometers can be effected using interpolation, so accuracy is markedly improved. In the prior art calibration particularly using a metal-carbon eutectic as the fixed-point material, the fixed-point temperature that can be realized is up to 2474° C. At temperatures higher than 2474° C. the temperature scale have to be defined by extrapolation. This results in an increase in accuracy deterioration as the temperature higher than 2474° C. increases. In the present invention using a carbide-carbon eutectic as the fixed-point material, however, the temperature up to 3445° C. can be realized to reduce the accuracy error to ¼ at 3000° C. and at 4000° C. enhance the accuracy by one order of magnitude, as compared with that of the prior art using a carbon-metal eutectic.

The present invention also makes it possible to maintain the temperature scale by utilizing a radiation thermometer calibrated at the fixed point temperature without using a standard ribbon lamp, as was necessary in the prior art. The present invention also eliminates the conventional need for evaluating accuracy characteristics of high-precision standard radiation thermometers, greatly simplifying the calibration operation and helping to advance the provision of a temperature scale system.

In addition to the calibration of thermometers, the fixed-point cell can also be applied in the fields of blackbody radiation measurement and photometrics.

What is claimed is:

1. A fixed-point cell, comprising:
   a crucible composed of carbon and a fixed-point material enclosed in said crucible, wherein the outer surface of said crucible forms a cavity, and
   wherein the fixed-point material is a eutectic structure of carbide and carbon.

2. A fixed-point cell according to claim 1,
   wherein the carbide is selected from the group consisting a carbide of boron, molybdenum, vanadium, titanium, zirconium, hafnium, niobium, tantalum, tungsten and a rare earth element.

3. The fixed-point cell of claim 1, wherein said carbide is boron carbide.

4. The fixed-point cell of claim 1, wherein said carbide is molybdenum carbide.

5. The fixed-point cell of claim 1, wherein said carbide is vanadium carbide.

6. The fixed-point cell of claim 1, wherein said carbide is titanium carbide.

7. The fixed-point cell of claim 1, wherein said carbide is zirconium carbide.

8. The fixed-point cell of claim 1, wherein said carbide is hafnium carbide.

9. The fixed-point cell of claim 1, wherein said carbide is niobium carbide.

10. The fixed-point cell of claim 1, wherein said carbide is tantalum carbide.

11. The fixed-point cell of claim 1, wherein said carbide is tungsten carbide.

12. The fixed-point cell of claim 1, wherein said carbide is a carbide of a rare earth element.

13. A fixed-point temperature realizing apparatus, comprising:
    a fixed-point cell comprising a crucible composed of carbon and a fixed-point material enclosed in the crucible that is a eutectic structure of carbide and carbon, wherein the outer surface of said crucible forms a cavity,
    a furnace having the cell disposed therein
    a thermometer.

14. A fixed-point temperature realizing apparatus according to claim 13, wherein the carbide is selected from the group consisting of a carbide of boron, molybdenum, vanadium, titanium, zirconium, hafnium, niobium, tantalum, tungsten, and a rare earth element.

15. The fixed-point temperature realizing apparatus according to claim 13, wherein the thermometer is a radiation thermometer.

16. A method for calibrating a thermometer comprising:
    enclosing a fixed-point material that is a eutectic structure of carbide and carbon in a crucible composed of carbon to form a fixed-point cell, wherein the outer surface of said crucible forms a cavity,
    raising and lowering the temperature of the cell, measuring temperature variation in said cavity of the cell with a thermometer, and
    calibrating the thermometer based on measured temperature variation.

17. The calibration method according to claim 16, wherein the carbide is selected from the group consisting of a carbide of boron, molybdenum, vanadium, titanium, zirconium, hafnium, niobium, tantalum, tungsten and a rare earth element.

18. The calibration method according to claim 16, wherein the thermometer is a radiation thermometer.

19. A fixed-point cell, comprising:
    a crucible composed of carbon containing a fixed-point material which is a eutectic structure of carbon and carbide,
    wherein the outer surface of said crucible forms a blackbody cavity.

20. An apparatus comprising the fixed-point cell of claim 19.

* * * * *